(12) United States Patent
Yoon et al.

(10) Patent No.: US 9,647,833 B2
(45) Date of Patent: May 9, 2017

(54) SYSTEM AND METHOD FOR IDENTITY-BASED KEY MANAGEMENT

(71) Applicants: SAMSUNG SDS CO., LTD., Seoul (KR); SDS AMERICA, INC., Moonachie, NJ (US)

(72) Inventors: Hyo-Jin Yoon, Seoul (KR); Madjid Nakhjiri, San Jose, CA (US)

(73) Assignees: SAMSUNG SDS CO., LTD., Seoul (KR); SDS AMERICA, INC., Moonachie, NJ (US)

( * ) Notice: Subject to any disclaimer, the term of this patent is extended or adjusted under 35 U.S.C. 154(b) by 124 days.

(21) Appl. No.: 14/447,985

(22) Filed: Jul. 31, 2014

(65) Prior Publication Data
US 2015/0039883 A1 Feb. 5, 2015

Related U.S. Application Data

(60) Provisional application No. 61/860,420, filed on Jul. 31, 2013.

(30) Foreign Application Priority Data

Dec. 30, 2013 (KR) ........................ 10-2013-0166559

(51) Int. Cl.
H04L 29/06 (2006.01)
H04L 9/08 (2006.01)
H04L 9/32 (2006.01)

(52) U.S. Cl.
CPC .......... *H04L 9/0847* (2013.01); *H04L 9/0863* (2013.01); *H04L 9/3226* (2013.01); *H04L 63/0442* (2013.01); *H04L 63/061* (2013.01); *H04L 63/083* (2013.01); *H04L 63/0853* (2013.01)

(58) Field of Classification Search
CPC ... H04L 9/0863; H04L 9/3226; H04L 63/061; H04L 63/083
See application file for complete search history.

(56) References Cited

U.S. PATENT DOCUMENTS

| 6,151,676 A * | 11/2000 | Cuccia ................. H04L 9/3013 380/259 |
| 7,317,798 B2 * | 1/2008 | Saito ................... H04L 63/0435 380/264 |
| 8,028,161 B2 * | 9/2011 | Kroselberg ........... H04L 63/061 709/225 |
| 8,108,678 B1 * | 1/2012 | Boyen .................. H04L 9/0847 380/30 |
| 2005/0071632 A1 * | 3/2005 | Pauker ................ H04L 63/0442 713/165 |

(Continued)

Primary Examiner — Carl Colin
Assistant Examiner — Gary Lavelle
(74) Attorney, Agent, or Firm — Sughrue Mion, PLLC

(57) ABSTRACT

A system and method for identity (ID)-based key management are provided. The ID-based key management system includes an authentication server configured to authenticate a terminal through key exchange based on an ID and a password of a user of the terminal, set up a secure channel with the terminal, and provide a private key based on the ID of the user to the terminal through the secure channel, and a private-key generator configured to generate the private key corresponding to the ID of the terminal user according to a request of the authentication server.

17 Claims, 8 Drawing Sheets

(56) References Cited

U.S. PATENT DOCUMENTS

| | | | |
|---|---|---|---|
| 2006/0156026 A1* | 7/2006 | Utin | G06F 21/31 713/183 |
| 2008/0092216 A1* | 4/2008 | Kawano | G06F 21/46 726/5 |
| 2011/0173452 A1* | 7/2011 | Nan | H04L 9/083 713/179 |
| 2013/0097428 A1* | 4/2013 | Rhee | H04L 9/006 713/183 |
| 2013/0124292 A1* | 5/2013 | Juthani | G06F 21/41 705/14.26 |
| 2013/0227286 A1* | 8/2013 | Brisson | H04L 63/062 713/168 |
| 2015/0222435 A1* | 8/2015 | Lea | H04L 63/0823 713/155 |

* cited by examiner

SYSTEM AND METHOD FOR IDENTITY-BASED KEY MANAGEMENT

CROSS-REFERENCE TO RELATED APPLICATION

This application claims the benefit of Korean Patent Application No. 10-2013-0166559, filed on Dec. 30, 2013, in the Korean Intellectual Property Office, and the benefit of U.S. Provisional Application No. 61/860,420, filed on Jul. 31, 2013, in the U.S. Patent and Trademark Office, the disclosures of which are incorporated herein by reference in their entireties.

BACKGROUND

1. Technical Field

The present disclosure relates to security technology on a network.

2. Discussion of Related Art

As the provision of service through the Internet has been widespread, security on the network has been gradually important. In particular, the number of services such as Internet banking and electronic commercial as well as the provision of simple information through the Internet has increased and the demand for technology for securely delivering important information on the Internet has gradually increased.

There is an identity (ID)-based cryptography (IBC) scheme as one of security techniques on the network. Because the IBC scheme has various merits in that a separate certificate is unnecessary and it is unnecessary to distribute an encryption key in advance, the IBC scheme has recently been used in various fields.

However, the IBC technology of the related art does not include a method of configuring a secure channel between a server and a user for issuing a private key or a method of configuring a secure channel using network security technology such as a public key infrastructure (PKI)-based transport layer security (TLS)/secure sockets layer (SSL) is applied. However, when the algorithm of the related art is introduced for private-key issuance in this manner, there is a problem in that the merit of the IBC itself in which a separate certificate is unnecessary is not available. In other words, because a terminal should manage the separate certificate for issuing a private key according to the related art, a burden for certificate management is imposed and safety in a key issuance process may not be perfectly ensured.

SUMMARY

Exemplary embodiments of the present disclosure provide means for user authentication and secure channel securement for key issuance in an IBC architecture. Also, exemplary embodiments of the present disclosure are directed to providing means for enhancing security of a key to be used in IBC and easily updating the key.

According to exemplary embodiments of the present disclosure, there is provided an ID-based key management system including: an authentication server configured to authenticate a terminal through key exchange based on an ID and a password of a user of the terminal, set up a secure channel with the terminal, and provide a private key based on the ID of the user to the terminal through the secure channel; and a private-key generator configured to generate the private key corresponding to the ID of the terminal user according to a request of the authentication server.

The authentication server may generate an ID-based secret key using a key generation factor exchanged with the terminal and decrypt the password transmitted from the terminal using the secret key.

The authentication server may authenticate the ID and the password using a hardware security module (HSM).

The authentication server may generate a temporary ID corresponding to a cycle by adding a predetermined cycle-specific padding character string to the ID of the terminal user and acquire the private key corresponding to the temporary ID through communication with the private-key generator.

The private-key generator may generate the private key using an HSM.

The padding character string may include date information of the cycle.

The padding character string may include a terminal-side random character string and a server-side ID-based signature (IBS) of the cycle.

The authentication server may receive the terminal-side random character string from the terminal; generate the temporary ID by adding the received terminal-side random character string to the ID of the terminal; generate the server-side IBS for the temporary ID using the private key of the authentication server; and transmit the generated server-side IBS to the terminal.

The authentication server may generate the server-side IBS using an HSM.

The padding character string may include a terminal-side random character string and a server-side random character string of the cycle.

An update cycle of the terminal-side random character string may be set to be different from an update cycle of the server-side random character string.

The authentication server may exchange the terminal-side random character string and the server-side random character string with the terminal and generates the temporary ID by adding the exchanged terminal-side random character string and the server-side random character string to the ID of the terminal user.

The authentication server may generate an ID-based session key using a key generation factor exchanged with the terminal, encrypt the private key with the generated session key, and provide the encrypted private key to the terminal.

According to other exemplary embodiments of the present disclosure, there is provided an ID-based key management method including: authenticating, by an authentication server, a terminal through key exchange based on an ID and a password of a user of the terminal to set up a secure channel with the terminal; generating, by the authentication server, a private key based on the ID of the user; and providing, by the authentication server, the private key to the terminal through the secure channel.

The authenticating may further include: exchanging a key generation factor with the terminal; generating an ID-based secret key using the key generation factor; and decrypting the password transmitted from the terminal using the secret key.

The generating may further include: generating a temporary ID corresponding to a cycle by adding a predetermined cycle-specific padding character string to the ID of the terminal user; and calculating the private key corresponding to the temporary ID.

The padding character string may include date information of the cycle.

The padding character string may include a terminal-side random character string and a server-side IBS of the cycle.

The authenticating may further include: receiving the terminal-side random character string from the terminal; generating the temporary ID by adding the received terminal-side random character string to the ID of the terminal; generating the server-side IBS for the temporary ID using the private key of the authentication server; and transmitting the generated server-side IBS to the terminal.

The padding character string may include a terminal-side random character string and a server-side random character string of the cycle.

An update cycle of the terminal-side random character string may be set to be different from that of the server-side random character string.

The authenticating may further include: exchanging the terminal-side random character string and the server-side random character string with the terminal; and generating the temporary ID by adding the exchanged terminal-side random character string and the server-side random character string to the ID of the user.

The providing may further include: encrypting the private key with an ID-based session key generated using a key generation factor exchanged with the terminal; and providing the encrypted private key to the terminal.

According to the exemplary embodiments of the present disclosure, there is an advantageous effect in that it is possible to issue a key and enhance security without managing a separate certificate by performing user authentication and secure channel securement for key issuance through key exchange based on an ID and a password.

Also, according to the exemplary embodiments of the present disclosure, there is an advantage in that it is possible to enhance security of a key and simultaneously easily update the key by adding a cyclically updated padding to a user ID to be used in IBC.

Also, according to the exemplary embodiments of the present disclosure, there is an advantage in that it is possible to maintain higher-level security than in the related art using a separate HSM in a process for user authentication and secure-channel setup of the authentication server 104.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Although exemplary embodiments of the present disclosure will be described in detail below with reference to the accompanying drawings, the present disclosure is not limited thereto.

In the following description, well-known technology related to the exemplary embodiments is not described in detail in order to keep the disclosure clear and concise. Terms used herein have been chosen in consideration of functionality of the exemplary embodiments, and may vary depending on a user's or an operator's intentions, or customs in the art. Therefore, the meanings of terms should be interpreted based on the overall context of the present specification.

The technical ideas of the present disclosure shall be defined by the appended claims, and the following embodiment shall only be mere means for efficiently describing the technical ideas of the present disclosure to those who are skilled in the art to which the present disclosure pertains.

Figure 1:
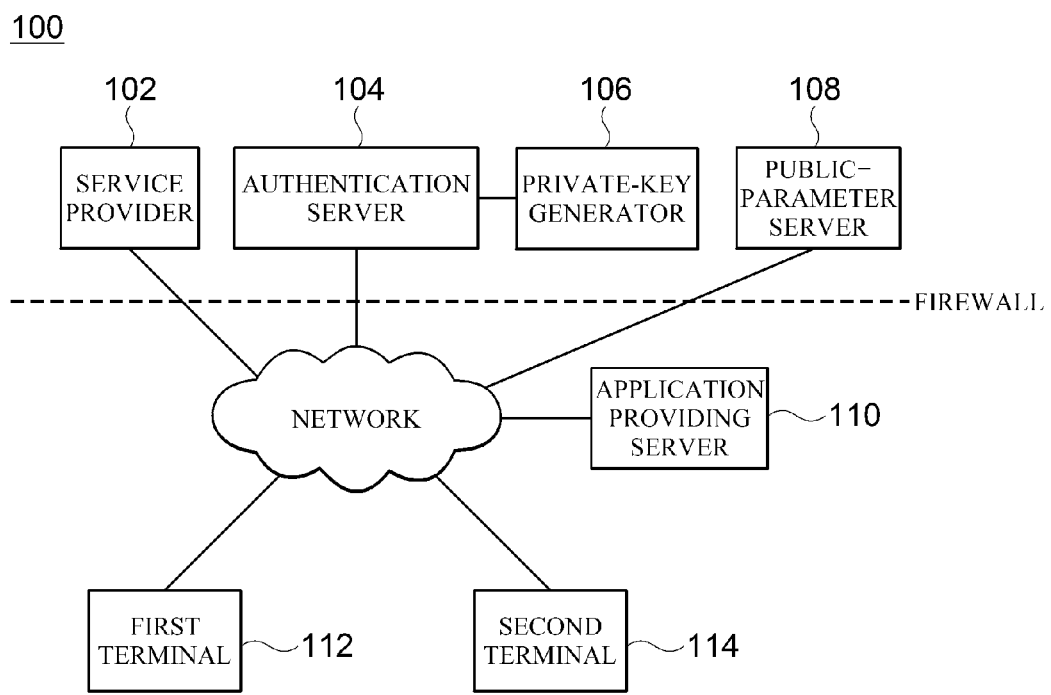
FIG. 1 is a block diagram illustrating an ID-based key management system 100 according to an exemplary embodiment of the present disclosure.

FIG. 1 is a block diagram illustrating an ID-based key management system 100 according to an exemplary embodiment of the present disclosure. As illustrated, the ID-based key management system 100 according to the exemplary embodiment of the present disclosure includes a service provider 102, an authentication server 104, a private-key generator 106, a public-parameter server 108, an application providing server 110, a first terminal 112, and a second terminal 114. This ID-based key management system 100 is configured to exchange a message (packet) through a network. In the exemplary embodiment of the present disclosure, the present disclosure is not limited to a type of network and all types of networks capable of packet communication such as a wired/wireless Internet network and a mobile communication network may be included. In addition, in order to prevent the intrusion of a malicious user, etc. through the network, the service provider 102, the authentication server 104, the private-key generator 106, and the public-parameter server 108 may be protected through at least a firewall.

The service provider 102 is a server for providing an Internet-based service to users on the network. For example, the service provider 102 can provide various types of services such as an instant messaging service, a voice over Internet protocol (VoIP) service, a multimedia providing service, and a search service. The service provider 102 and the authentication server 104 as will be described later may be provided by the same network service provider, and the service provider 102 and the authentication server 104 may belong to different network service providers.

The authentication server 104 is a server for performing user authentication for private key issuance. The authentication server 104 authenticates the terminal 112 or 114 through ID-based password authenticated key exchange for a user of the first terminal 112 or the second terminal 114 (hereinafter referred to as the terminal 112 or 114) as will be described later and simultaneously sets up a secure channel with the terminal 112 or 114. In addition, the authentication server 104 provides an ID-based private key of a user of the terminal to the terminal 112 or 114 through the secure channel. The authentication server 104 may include a separate HSM for authenticating an ID and password of the user.

According to a request of the authentication server 104, the private-key generator 106 generates a private key corresponding to a user ID of the terminal 112 or 114 and provides the generated private key to the authentication server 104. Although an example in which the private-key generator 106 is connected to the authentication server 104, the generated private key is provided to the authentication server 104, and the authentication server 104 provides the private key to the terminal 112 or 114 has been disclosed in the illustrated exemplary embodiment, the private-key generator 106 also may directly transmit the generated private key to the terminal 112 or 114.

The public-parameter server 108 is a server which stores and manages public parameters necessary in an authentication and private-key delivery process between the authentication server 104 and the terminal 112 or 114. For example, the public-parameter server 108 may store and manage an application necessary for the terminal 112 or 114 to connect to the authentication server 104, perform authentication, and receive a private key. The above-described application may be directly provided from the public-parameter server 108 to the terminal 112 or 114 or provided through a separate application providing server 110. In addition, the public-parameter server 108 may store and manage system parameters for authentication between the authentication server 104 and the terminal 112 or 114 and provide the system parameters to the authentication server 104 and the terminal 112 or 114 if necessary. According to an exemplary embodiment, the system parameters may be included in the above-described application and provided separately from the application. The above-described system parameters will be described in detail later.

The application providing server 110 is a server which receives and stores the above-described application from the public-parameter server 108 and provides the application according to a request of the terminal 112 or 114. For example, the application providing server 110 may be a type of application store or market that provides an application sale or download service on the network. In addition, the application providing server 110 may verify the validity of an application to be provided to the terminal 112 or 114 using an IBS, another type of signature, or authentication technology.

The first terminal 112 and the second terminal 114 exchange an encrypted message using their IDs and ID-based private keys provided from the authentication server 104.

First, the first terminal 112 and the second terminal 114 connect to the service provider 102 using an application or the like provided from the application providing server 110 or the public-parameter server 108 and generate IDs and passwords for using a service from the service provider 102. Thereafter, the first terminal 112 and the second terminal 114 receive private keys from the authentication server 104 using the generated IDs and passwords and perform encrypted communication using the received private keys.

Communication between the first terminal 112 and the second terminal 114 is performed using the IDs of the terminal users and the private keys of the terminal users generated from the IDs. For example, when the first terminal 112 delivers a message to the second terminal 114, the first terminal 112 encrypts the message using an encryption algorithm in which the user ID of the second terminal 114 is a public key. The second terminal 114 receiving the message decrypts the encrypted message using the private key provided from the authentication server 104 corresponding to the ID. This ID-based encryption communication process will be described in detail later.

Figure 2:
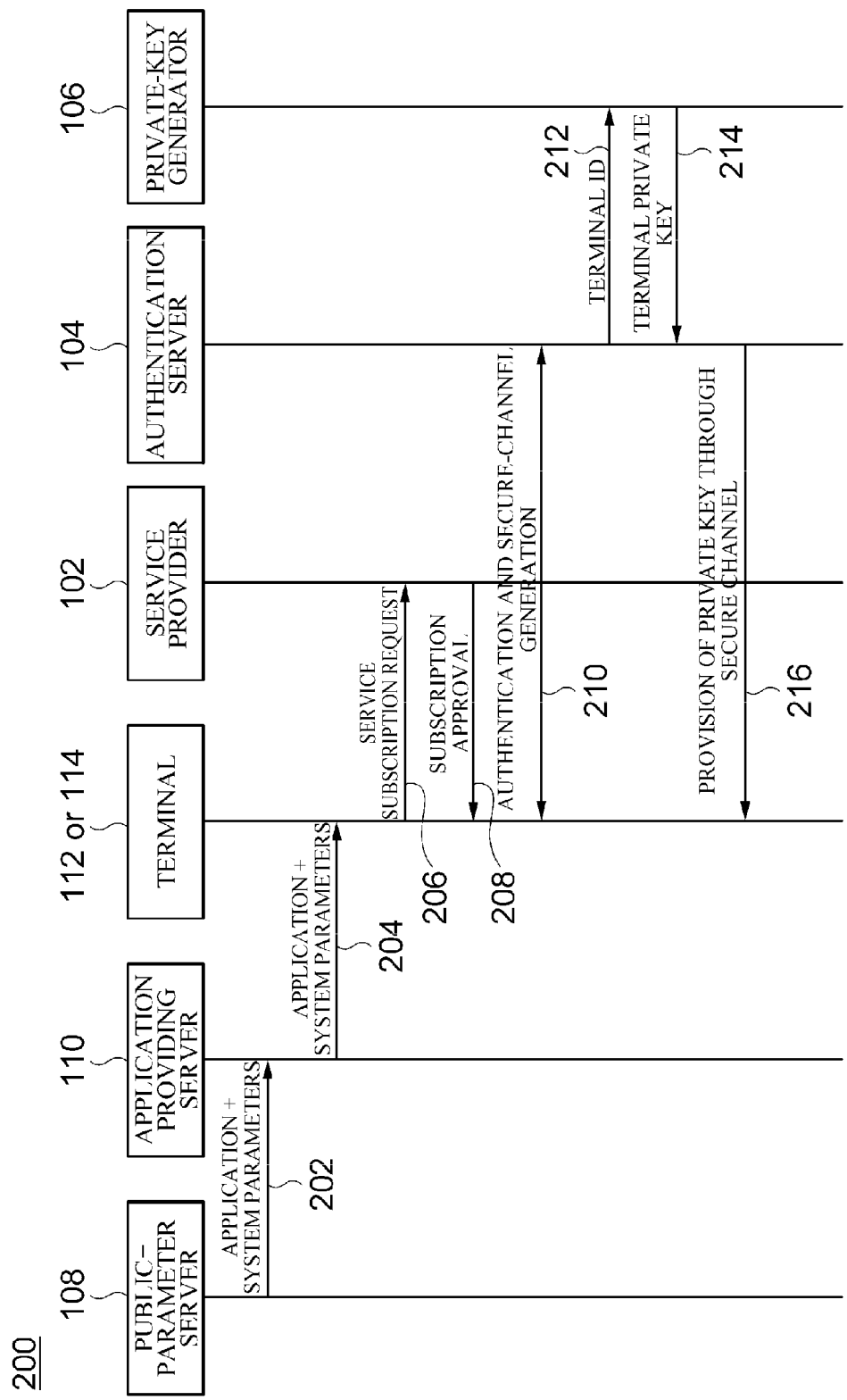
FIG. 2 is a sequence diagram 200 illustrating an authentication and private key issuance process in the ID-based key management system 100 according to an exemplary embodiment of the present disclosure.

FIG. 2 is a sequence diagram 200 illustrating an authentication and private key issuance process in the ID-based key management system 100 according to an exemplary embodiment of the present disclosure.

First, the public-parameter server 108 provides an application (including system parameters) for an authentication and private key issuance process of the terminal 112 or 114 to the application providing server 110 (202) and the terminal 112 or 114 downloads the application from the application providing server 110 (204). As described above, the application providing server 110 may verify the validity of the application using an IBS, another type of signature, or authentication technology. In addition, although an example in which the terminal 112 or 114 downloads the application from the application providing server 110 is illustrated in the drawings, the terminal 112 or 114 may directly download the above-described application from the public-parameter server 108.

Next, the user of the terminal 112 or 114 generates an ID and a password through membership subscription by accessing the service provider 102 which provides his/her own desired service (206) and the service provider 102 approves the membership subscription of the above-described user (208). In this process, the service provider 102 may verify the uniqueness of the ID submitted by the user or perform user verification (ID verification, etc.) at an appropriate level. The above-described steps 206 and 208 may be performed between the terminal 112 or 114 and the service provider 102 regardless of the authentication server 104. In addition, if the user registered in the service provider 102 additionally performs the authentication through the authentication server 104, the above-described steps 206 and 208 may be omitted.

Next, the authentication server 104 performs user authentication of the terminal 112 or 114 using issued IDs and passwords (210). In addition, in this process, in order to securely deliver private keys corresponding to user IDs from the authentication server 104 to the terminal 112 or 114, a secure channel is generated between the authentication server 104 and the terminal 112 or 114 and authentication on the validity of the authentication server 104 as well as the user authentication is also performed.

In the above-described step 210, a user ID-based password authenticated key exchange algorithm is available for authentication and secure-channel generation of the terminal 112 or 114 and the authentication server 104. In addition, in this process, information to be securely stored may be processed in an HSM connected to the authentication server 104.

If the above-described authentication process is completed, then the authentication server 104 delivers the user ID of the terminal 112 or 114 of the user authenticated by the authentication server 104 to the private-key generator 106 (212), and the private-key generator 106 calculates a private key corresponding to the delivered ID and delivers to the calculated private key to the authentication server 104. For secure message transmission and reception between the authentication server 104 and the private-key generator 106, the authentication server 104 and the private-key generator 106 may be configured to be provided within the same hardware, connected to an internal network disconnected from an external network, or to construct a separate secure communication channel between the authentication server 104 and the private-key generator 106. In addition, the private-key generator 106 may use a separate HSM for calculating the private key corresponding to the above-described ID.

The private key delivered to the authentication server 104 through the above-described process is securely delivered to the terminal 112 or 114 through the secure channel constructed between the authentication server 104 and the terminal 112 or 114 (216).

In the exemplary embodiment of the present disclosure, a message is encrypted using a cryptography algorithm in which an ID of a communication partner is a public key for encrypted communication between terminals, and the encrypted message is transmitted to the communication partner. Then, a receiver may decrypt the received encrypted message using the private key corresponding to a corresponding ID. As in the above-described example, if the first terminal 112 delivers the message to the second terminal 114, the first terminal 112 encrypts the message using a cryptography algorithm in which a user ID of the second terminal 114 is a public key. The second terminal 114 receiving the message decrypts the encrypted message using the private key provided from the authentication server 104 corresponding to the ID.

At this time, although an original ID of the communication partner is available for the above-described encrypted communication, a padding character string to be updated for every given cycle may be added to the ID according to the exemplary embodiment. At this time, an ID obtained by adding a padding character string to an original ID of the terminal user is referred to as a temporary ID of a corresponding cycle. That is, the temporary ID may be defined as follows.

$$\text{Temporary } ID = \text{Original } ID \| \text{Padding character string}$$

When the padding character string is added to the original ID in this manner, security may be further enhanced as compared to the use of only the original ID because a private key corresponding thereto is also to be updated every time the padding character string is updated. In addition, when the update of the private key according to the update of the above-described padding character string is linked to the membership management or billing policy, billing may be naturally performed through a private-key update process.

As an update cycle of the padding character string, various update cycles such as a day/week/month/quarter/year are applicable in consideration of service characteristics. The terminal user should secure a padding character string of the receiver valid in a corresponding cycle so that the terminal 112 or 114 actually starts encrypted communication with another terminal, a server, or the like.

In the exemplary embodiment of the present disclosure, the following three types of padding character strings are available. It should be noted that a method of generating a padding character string disclosed in the following description is only an example and the exemplary embodiments of the present disclosure is not limited to a padding implemented by a specific method.

First, there is a method using date information of a corresponding cycle as a padding character string. A date, a week, a month, a quarter, and a year may be used as the update cycle in a padding character string. This method has a merit in that it is unnecessary to download information from the authentication server 104 or the third party so as to acquire the padding character string. This is because anyone may know the date information of the corresponding cycle without any verification. However, according to this scheme, there is a problem in that the overload may be imposed on the authentication server 104 at a point in time at which a corresponding cycle ends when update cycles of all users are the same. For example, when all the users monthly update the padding character string, there is a problem in that private keys of all the users are to be updated at the beginning of every month. Accordingly, it is possible to distribute the overload by appropriately adjusting a user-specific update cycle.

There is a second scheme of using a terminal-side random character string (random padding) for a corresponding cycle of a user along with a signature of the authentication server 104. At this time, the signature can use an IBS. The terminal-side random character string (random padding) for the corresponding cycle of the user is delivered from the terminal 112 or 114 to the authentication server 104, and the authentication server 104 provides a server-side signature corresponding to the random character string to the terminal 112 or 114. This process may be included in a process in which the user receives an issued private key of a corresponding cycle. When the encrypted communication is performed, the transmitter should first secure the terminal-side random character string and the server-side signature for the terminal-side random character string from the receiver.

There is a third scheme using both a terminal-side random character string for a corresponding cycle of a user and a server-side random character string for ensuring the terminal-side random character string as a padding character string. A temporary ID of the corresponding cycle may be represented by a combination of the original ID and the terminal-side random character string and the server-side random character string of the corresponding cycle. This scheme has a merit in that it is unnecessary to separately check a signature of the server differently from the second scheme and the overload on the server is distributed. However, in this scheme, the server-side random character string is to be updated for every set cycle separately from the terminal-side random character string. The server-side random character string may be broadcast through a common channel for every update cycle or delivered from the authentication server 104 to the terminal 112 or 114 through a push message.

The update cycle of the terminal-side random character string does not need to be same as the update cycle of the server-side random character string. For example, the update cycle of the terminal-side random character string may be maintained to be longer than the update cycle of the server-side random character string. For example, when the server-side random character string is updated daily, the terminal-side random character string may be configured to be updated in a cycle longer than a daily cycle, for example, weekly or monthly. In addition, when the update cycle of the terminal-side random character string of the user is set to be same as a billing cycle, a fee may be charged to the user along with the update of the random character string in relation to a billing policy.

Hereinafter, an authentication and secure-channel setup process between the terminal 112 or 114 and the authentication server 104 will be described in detail. First, description of system parameters for authentication and secure-channel setup between the terminal 112 or 114 and the authentication server 104 are as follows.

First, p≡3 (mod 4) and q≡3 (mod 4) are satisfied and N=pq is calculated from large prime numbers p and q close to B-smooth. In this case, p and q satisfy a security level corresponding to a given security parameter and are cryptographically secure prime numbers. The security parameter means an element of an algorithm determining the time and cost for a basic attack for a cryptography algorithm. At this time, the basic attack is an attack of an exhaustive search scheme of searching for all possible keys until a key capable of satisfying given data (plaintext and ciphertext) is found. Because a time taken to perform the exhaustive search depends upon the number of possible keys and the number of keys is determined by a key length, this case represents that a security parameter is the key length. In addition, a value "B" may be appropriately set according to the above-described security level.

Next, a Hash function H and a random Hash function $h_i$ for use in secret key exchange are defined. A generator of a maximal cyclic subgroup of a finite group $Z_N=\{0, 1, 2, \ldots, N-1\}$ is assumed to be $\tilde{g}$. When the cyclic subgroup generated by the generator $g=\tilde{g}^2$ is defined as $\tilde{g}$, the Hash function H is defined from G as shown in the following Equation (1).

$$H:\{0,1\}^* \to G \quad (1)$$

(In Equation (1), $\{0, 1\}^*$ is an arbitrary finite bit stream including 0's and 1's.)

That is, the Hash function H is defined so that an output value becomes an element of a group G when an ID is set as an input value. For example, in the following random Hash function $h:\{0, 1\}^* \to Z_n$, the Hash function H may be defined as shown in the following Equation (2).

$$H(ID)=h(ID)^2 \quad (2)$$

In addition, the Hash function $H_i$ is defined as shown in the following Equation (3).

$$H_i:\{0,1\}^* \to \{0,1\}^{ni} \quad (3)$$

(In Equation (3), $\{0, 1\}^{ni}$ is an $n_i$-bit character string including arbitrary bits of 0's or 1's and $i \in \{0, 1, 2, 3, 4\}$.)

That is, in the exemplary embodiment of the present disclosure, five random Hash functions are used and the number of bits of an output value of each random Hash function may be appropriately defined according to a specific form of an algorithm. That is, values $n_0$ to $n_6$ may be appropriately set. Although, for example, a secure Hash algorithm (SHA)-1, SHA-256, SHA-512, etc. may be used as the random Hash function, the present disclosure is not limited to a specific function. In addition, although random Hash functions have been described as having values 0 to 4 in the above-described exemplary embodiment, these are only used for distinguishing the random Hash functions and the random Hash functions do not have a specific order.

A system parameters $param_R$ and a master key mk derived through this process are as follows.

$$param=\{N,G,g,H,h_0,h_1,h_2,h_3,h_4\}$$

$$mk=(p,q)$$

Figure 3:
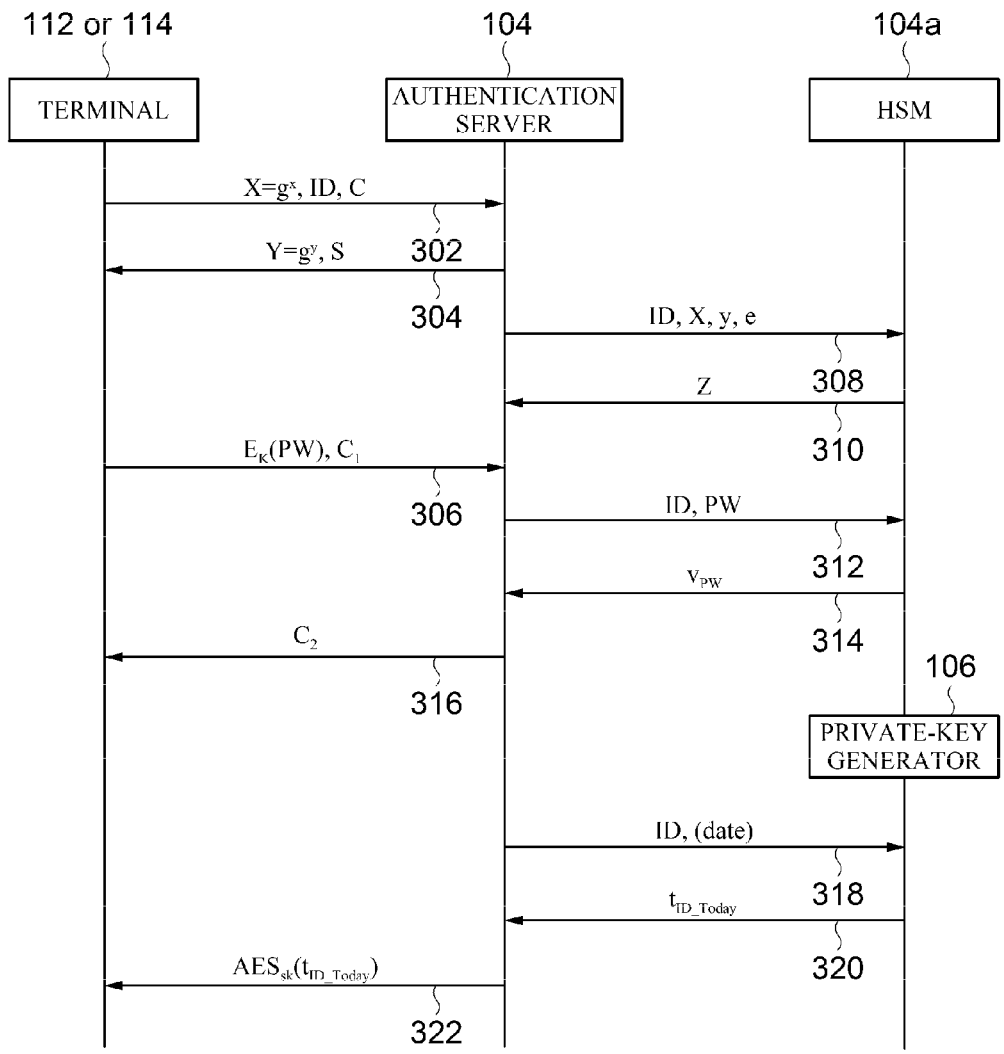
FIG. 3 is a sequence diagram 300 illustrating a private key issuance process according to a first exemplary embodiment of the present disclosure.

FIG. 3 is a sequence diagram 300 illustrating a private key issuance process according to a first exemplary embodiment of the present disclosure. In the case of the illustrated first exemplary embodiment, date information of a corresponding cycle is used as a padding character string.

First, the authentication server 104 stores a private key $t_{ID}=\log_g(H(ID))$ and a password pw or a Hash value PW=H (pw) of the password corresponding to each user ID. Specifically, the authentication server 104 may include a separate HSM 104a for securely storing the private key and the password PW or pw.

When the user inputs its own ID and password pw through the terminal 112 or 114, the user terminal 112 or 114 selects an arbitrary random number x and calculates a first secret key element X from the selected random number x. At this time, the first secret element may be calculated as follows.

$$X=g^x$$

The terminal 112 or 114 delivers a client-specific value C and the calculated first secret element X to the authentication server 104 (302). At this time, the above-described client-specific value C, for example, may be a serial number, a network address, a telephone number, or the like of the terminal 112 or 114 as a value for identifying the terminal 112 or 114 from other terminals.

The authentication server 104 also selects an arbitrary random number y and calculates a second secret key element $Y=g^y$ from the selected random number y. The calculated second secret key element Y is delivered to the terminal 112 or 114 along with the server-specific value S (304). The server-specific value S, for example, may be a serial number or a network address of the authentication server 104 or a value for identifying the authentication server 104.

Thereafter, after calculating e, Z, K, sk, and $C_1$ as follows, the terminal 112 or 114 encrypts the password PW or pw of the user using K as the secret key and delivers the encrypted password of the user to the authentication server 104 along with $C_1$ (306).

$$I=H(ID)$$

$$e=h_0(X,Y,I,C,S)$$

$$Z=(Y \cdot I^e)^x \bmod N$$

$$K=h_1(Z,I,e,X,Y,C,S)$$

$$sk=h_2(Z,I,e,X,Y,C,S)$$

$$C_1=h_3(sk,I,X,Y,C,S)$$

On the other hand, using the above-described same method, the authentication server 104 calculates e and delivers an ID (or I), X, y, and e to the HSM 104a so as to calculate a value Z (308). Then, the HSM 104a calculates the value Z as follows using the above-described keys and a pre-stored private key $t_{ID}$ and returns the value Z to the authentication server 104 (310).

$$Z=X^{y+tID \cdot e} \bmod N$$

The authentication server 104 calculates a secret key K using the above-described value Z and restores an encrypted message received from the terminal 112 or 114 using the calculated secret key to obtain the user's password PW or pw from the restored message. Thereafter, the authentication server delivers the user's ID and password to the HSM 104a to make a validity check request (312), and the HSM 104a returns a verification value $v_{pw}$ when it is determined that the ID/password is valid after the validity of the ID and password received according to the above-described request is verified (314). At this time, the above-described validity check may be implemented in the form of a message authentication code (MAC). When the validity check of the HSM 104a on the password delivered from the terminal 112 or 114 succeeds, the authentication server 104 may authenticate that the terminal 112 or 114 is a valid user. When the authentication of the terminal 112 or 114 is completed in this manner, the authentication server 104 calculates a session key sk and $C_2$ using Z and delivers $C_2$ to the terminal 112 or 114 (316). Then, the terminal 112 or 114 authenticates that the authentication server 104 is a valid server by verifying the validity of transmitted $C_2$.

That is, through the above-described process, the terminal 112 or 114 performs independent authentication by verifying the fact that the terminal 112 or 114 knows its own ID and password and the authentication server 104 performs independent authentication by verifying the fact that the authentication server 104 knows a private key $t_{ID}$ corresponding to the ID of the terminal 112 or 114. In addition, a secure channel for mutual secure communication is constructed through a session key sk generated through the above process.

When the authentication and secure-channel setup are completed through the above-described process, then the authentication server 104 delivers an ID of the user and date information of a corresponding cycle to the private-key generator 106 (318). Although the case in which the above-described cycle is assumed to be a "day" illustrated in the drawing, various cycles are designated as the above-described cycle as described above. In addition, when the private-key generator 106 knows current date information according to an exemplary embodiment, it is not necessary to separately deliver the date information.

The private-key generator 106 stores a master key for private key generation in a separate HSM (not illustrated). The private-key generator 106 generates a private key $t_{ID\_today}$ of a user corresponding to a certain cycle using the above-described HSM and delivers the generated private key $t_{ID\_today}$ to the authentication server 104 (320). Then, the authentication server 104 securely delivers the private key $t_{ID\_today}$ received using the above-described session key sk and the designated cryptography algorithm (which is assumed to be an advanced encryption system (AES) in the illustrated exemplary embodiment) (322). That is, the authentication server 104 encrypts the private key $t_{ID\_today}$ using the cryptography algorithm in which the session key is used as the encryption key, and delivers the encrypted private key $t_{ID\_today}$ to the terminal 112 or 114. The terminal 112 or 114 acquires the private key by decrypting the received message using the same session key as that of the authentication server 104.

Figure 4:
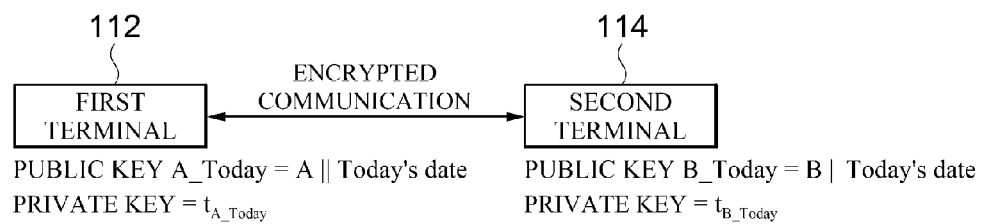
FIG. 4 is a diagram illustrating an encrypted message transmission and reception process between terminals receiving issued private keys according to the first exemplary embodiment of the present disclosure.

FIG. 4 is a diagram illustrating an encrypted message transmission and reception process between terminals receiving issued private keys according to the first exemplary embodiment of the present disclosure. When receiving private keys issued from the authentication server 104 through the above-described process, the first terminal 112 and the second terminal 114 can perform encrypted communication using public keys of communication partners. For example, assuming that the ID of the first terminal 112 is "A," the ID of the second terminal 114 is "B," an update cycle of a padding character string is a "day," the public keys and the private keys of the first terminal 112 and the second terminal 114 may be represented as follows.

In first terminal 112, Public key A_Today=A||Today's date
In first terminal 112, Private key=$t_{A\_Today}$
In second terminal 114, Public key B_Today=B||Today's date
In second terminal 114, Private key=$t_{B\_Today}$ Because data information of the corresponding cycle is known to all in this exemplary embodiment, there is an advantage in that the first terminal 112 and the second terminal 114 may immediately perform mutually encrypted communication without separately exchanging prearranged information.

Figure 5:
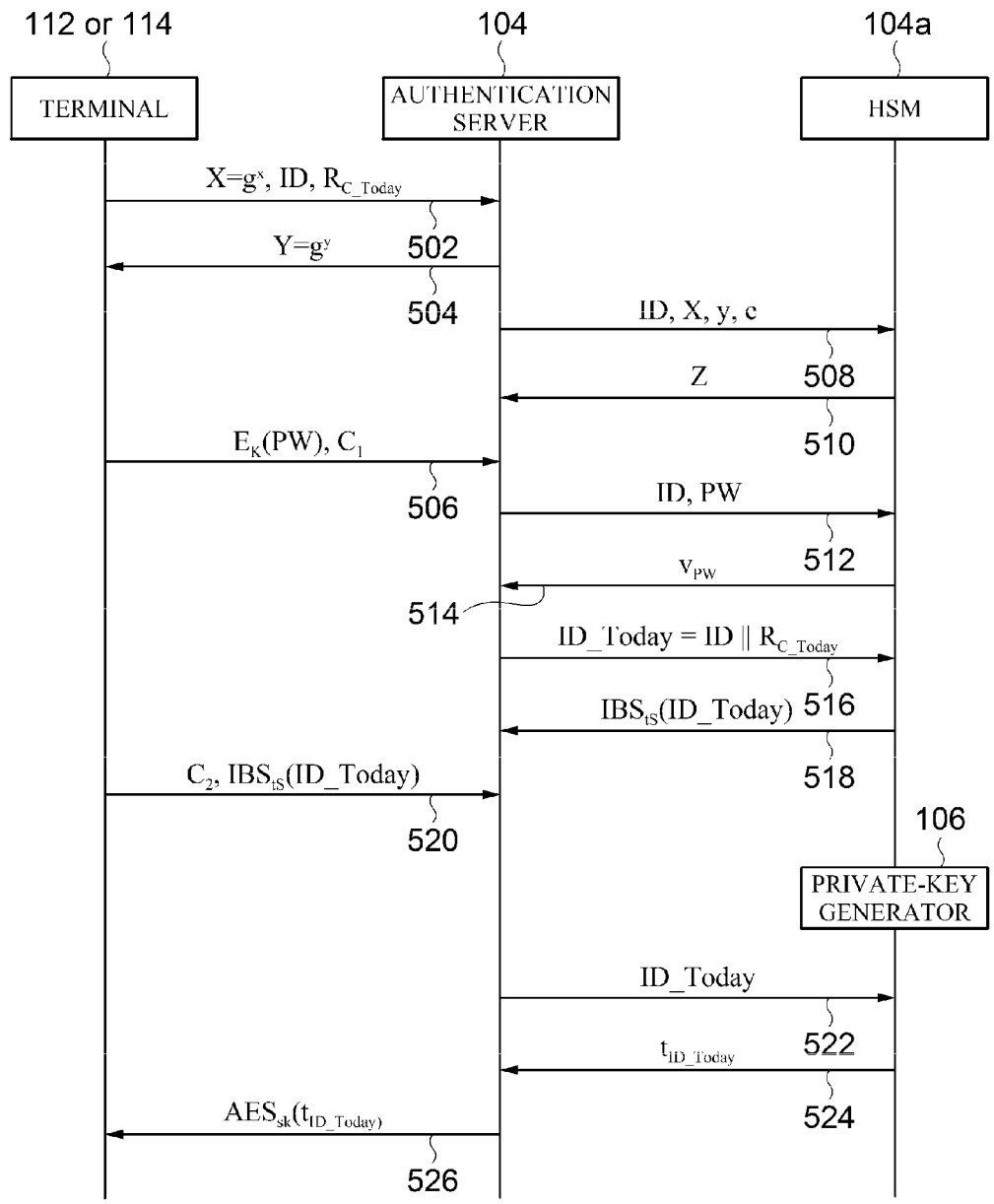
FIG. 5 is a sequence diagram 500 illustrating a private key issuance process according to a second exemplary embodiment of the present disclosure.

FIG. 5 is a sequence diagram 500 illustrating a private key issuance process according to a second exemplary embodiment of the present disclosure. The illustrated second exemplary embodiment is a scheme using a terminal-side random character string (random padding) of a corresponding cycle along with a signature of the authentication server 104. In the following description, it is assumed that the same values as those of the first exemplary embodiment are calculated through the same process as that of the first exemplary embodiment.

First, the authentication server 104 stores a private key $t_{ID}=\log_g(H(ID))$ and a password pw or a Hash value PW=H(pw) of the password corresponding to each user ID. Specifically, the authentication server 104 may include a separate HSM 104a for securely storing the private key and the password PW or pw.

When the user inputs its own ID and password pw through the terminal 112 or 114, the user terminal 112 or 114 selects an arbitrary random number x and calculates a first secret key element X from the selected random number x and delivers the ID, the first secret key element X, and the terminal-side random character string $R_{C\_Today}$ of a corresponding cycle to the authentication server 104 (502). In the illustrated exemplary embodiment, the update cycle of the terminal-side random character string is assumed to be a day.

The authentication server 104 also calculates a second secret key element $Y=g^y$ from an arbitrary random number y and delivers the calculated second secret key element Y to the terminal 112 or 114 (504).

Thereafter, after calculating e, Z, K, sk, and $C_1$ as follows, the terminal 112 or 114 encrypts the password PW or pw of the user using K as the secret key and delivers the encrypted password of the user to the authentication server 104 along with $C_1$ (506).

On the other hand, the authentication server 104 calculates e from the received information and delivers an ID (or I), X, y, and e to the HSM 104a so as to calculate a value Z (508). Then, the HSM 104a calculates the value Z as follows using the above-described values and a pre-stored private key $t_{ID}$ and returns the value Z to the authentication server 104 (510).

The authentication server 104 calculates a secret key K using the above-described value Z and restores an encrypted message received from the terminal 112 or 114 using the calculated secret key so as to obtain the user's password PW or pw from the restored message. Thereafter, the authentication server delivers the user's ID and password to the HSM 104a to make a validity check request (512), and the HSM 104a returns a verification value $v_{pw}$ when it is determined that the ID/password is valid after the validity of the ID and password received according to the above-described request is verified (514).

When the validity check of the HSM 104a on the password delivered from the terminal 112 or 114 succeeds, the authentication server 104 may authenticate that the terminal 112 or 114 is a valid user. When the authentication of the terminal 112 or 114 is completed in this manner, the authentication server 104 generates a public key ID_Today of the corresponding cycle as follows by adding the terminal-side random character string $R_{C\_Today}$ received in the above-described step 502 to the ID of the terminal 112 or 114 and delivers the generated public key ID_Today to the HSM 104a (516).

$$ID\_Today=ID||R_{C\_Today}$$

Then, the HSM 104a generates a server-side signature $IBS_{tS}(ID\_Today)$ corresponding to the above-described public key and returns the generated server-side signature $IBS_{tS}(ID\_Today)$ to the authentication server 104 (518).

Thereafter, the authentication server 104 calculates 104 calculates a session key sk and $C_2$ and delivers $C_2$ and the server-side signature $IBS_{tS}(ID\_Today)$ to the terminal 112 or 114 (520). Then, the terminal 112 or 114 authenticates that the authentication server 104 is a valid server by verifying the validity of transmitted $C_2$.

When the authentication, the secure-channel setup, and the server-side signature transmission are completed through the above-described process, then the authentication server 104 delivers a temporary ID ID_Today of a corresponding cycle of the user (522) to the private-key generator 106. As described above, the private-key generator 106 stores a master key for generating the private value in a separate HSM (not illustrated). The private-key generator 106 generates the private key $t_{ID\_today}$ of a user corresponding to a certain cycle using the above-described HSM and delivers the generated private key $t_{ID\_today}$ to the authentication server 104 (524). Then, the authentication server 104 securely delivers the private key $t_{ID\_today}$ received using the above-described session key sk and the designated cryptography algorithm (which is assumed to be an AES in the illustrated exemplary embodiment) (526). That is, the authentication server 104 encrypts the private key $t_{ID\_today}$ using the cryptography algorithm in which the session key is the encryption key, and delivers the encrypted private key $t_{ID\_today}$ to the terminal 112 or 114. The terminal 112 or 114 acquires the private key by decrypting the received message using the same session key as that of the authentication server 104.

Figure 6:
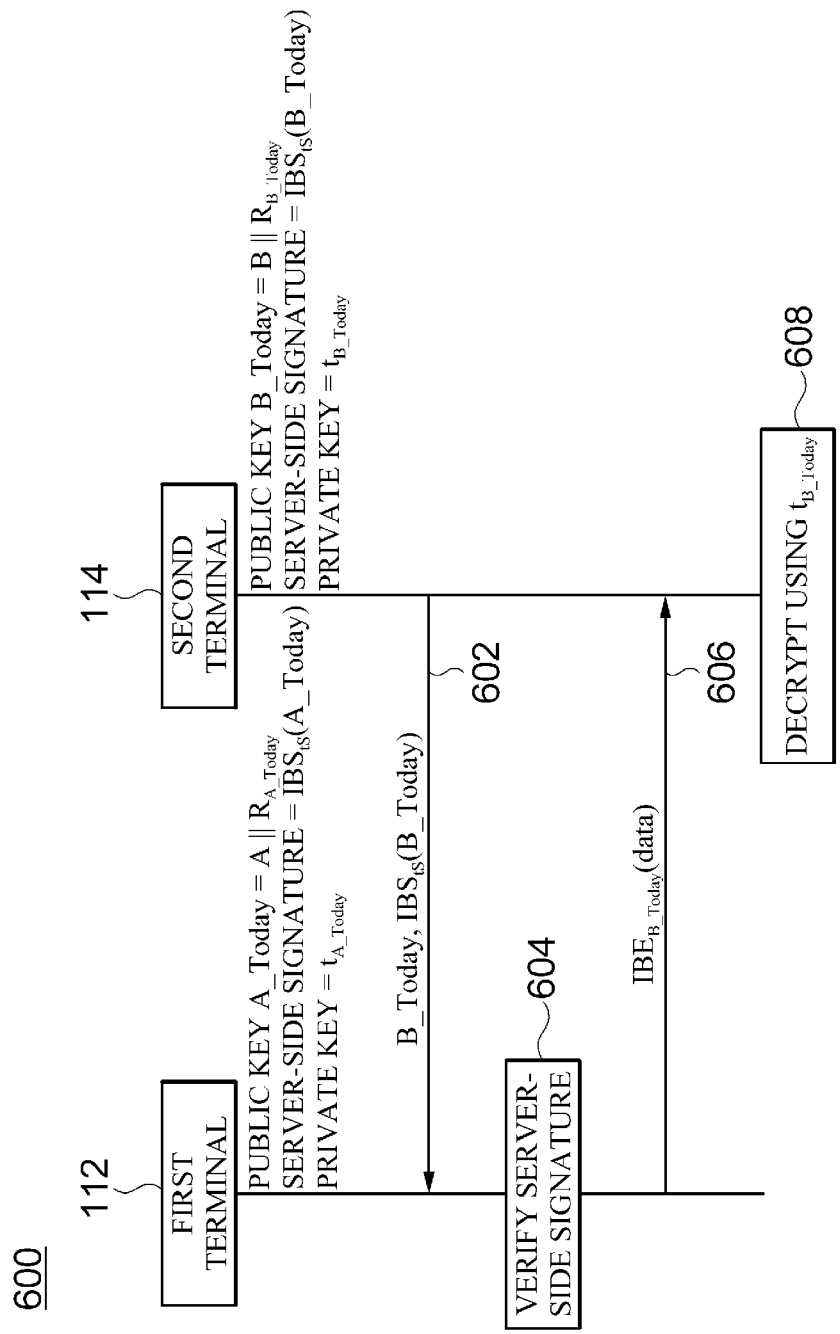
FIG. 6 is a diagram illustrating an encrypted message transmission and reception process between terminals receiving issued private keys according to the second exemplary embodiment of the present disclosure.

FIG. 6 is a diagram illustrating an encrypted message transmission and reception process between terminals receiving issued private keys according to the second exemplary embodiment of the present disclosure.

When receiving private keys issued from the authentication server 104 through the above-described process, the first terminal 112 and the second terminal 114 can perform encrypted communication using public keys of communication partners. For example, assuming that the ID of the first terminal 112 is "A," the ID of the second terminal 114 is "B," an update cycle of a client-side random character string is a "day," the public keys, the server-side signatures, and the private keys of the first terminal 112 and the second terminal 114 may be represented as follows.

In the first terminal 112, Public key $A\_Today=A\|R_{A\_Today}$

In the first terminal 112, Server-side signature=$IBS_{tS}(A\_Today)$

In the first terminal 112, Private key=$t_{A\_Today}$

In the second terminal 114, Public key $B\_Today=B\|R_{B\_Today}$

In the second terminal 114, Server-side signature=$IBS_{tS}(B\_Today)$

In the second terminal 114, Private key=$t_{B\_Today}$

Although separate server interaction is not necessary for every encrypted communication of a corresponding cycle before a message is transmitted in this exemplary embodiment differently from the first exemplary embodiment, a prearranged handshaking process for obtaining a valid client-side random character string of a corresponding cycle of the receiver before encryption is performed may be necessary. The sequence diagram illustrates a process in which the first terminal 112 transmits a message to the second terminal 114.

First, the first terminal 112 receives a public key B_Today of a corresponding cycle and a server-side signature $IBS_{tS}(B\_Today)$ from the second terminal 114 (602), and verifies the received server-side signature (604). If the verification result indicates that the received signature is valid, the first terminal 112 encrypts a message (data) using the public key B_Today of a corresponding cycle and transmits the encrypted message (data) to the second terminal 114 (606). This is represented by an expression $IBE_{B\_Today}(data)$, where IBE is ID-based encryption.

The second terminal 114 receiving the message restores the message by decrypting the received message using its own private key $t_{B\_Today}$ (608).

Figure 7:
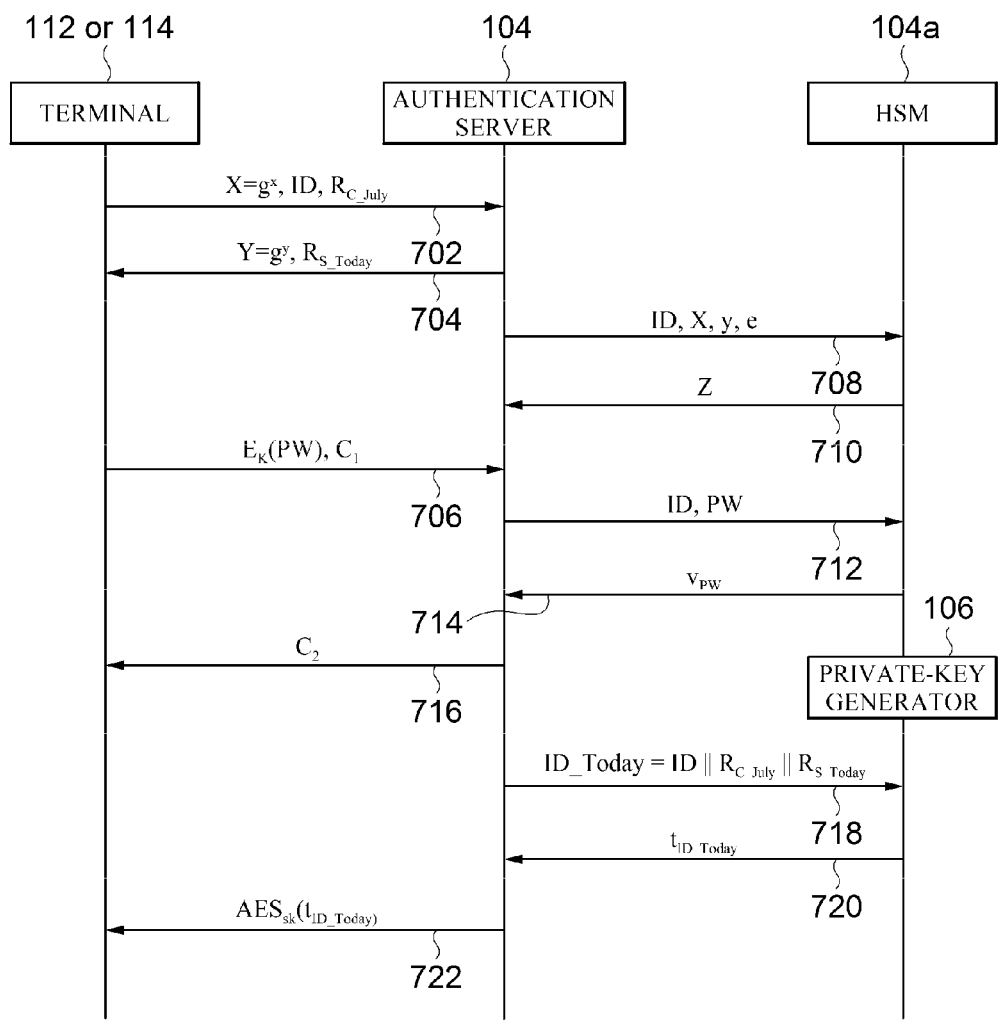
FIG. 7 is a sequence diagram 700 illustrating a private key issuance process according to a third exemplary embodiment of the present disclosure.

FIG. 7 is a sequence diagram 700 illustrating a private key issuance process according to a third exemplary embodiment of the present disclosure. The illustrated third exemplary embodiment is a scheme using both a terminal-side random character string of a corresponding cycle and a server-side random character string. In the following description, it is assumed that the same values as those of the first and second exemplary embodiments are calculated through the same process as those of the first and second exemplary embodiments.

First, the authentication server 104 stores a private key $t_{ID}=\log_g(H(ID))$ and a password pw or a Hash value PW=H(pw) of the password corresponding to each user ID. Specifically, the authentication server 104 may include a separate HSM 104a for securely storing the private key and the password PW or pw.

When the user inputs its own ID and password pw through the terminal 112 or 114, the user terminal 112 or 114 selects an arbitrary random number x and calculates a first secret key element X from the selected random number x and delivers the ID, the first secret key element X, and the terminal-side random character string $R_{C\_July}$ of a corresponding cycle to the authentication server 104 (702). In the illustrated exemplary embodiment, the update cycle of the terminal-side random character string is assumed to be a month and July is assumed to be the present month.

The authentication server 104 also calculates a second secret key element $Y=g^y$ from an arbitrary random number y and delivers the calculated second secret key element and the server-side random character string $R_{S\_Today}$ of the corresponding cycle to the terminal 112 or 114 (704). That is, the update cycle of the server-side random character string in the illustrated exemplary embodiment is assumed to be a "day" which is shorter than the update cycle of the terminal-side random character string. The above-described server-side random character string plays a role to authenticate the client-side random character string instead of the signature. That is, when the random character string of the server is updated, an ID of the user and a private key corresponding thereto are also updated.

Thereafter, after calculating e, Z, K, sk, and $C_1$ as follows, the terminal 112 or 114 encrypts the password PW or pw of the user using K as the secret key and delivers the encrypted password of the user to the authentication server 104 along with $C_1$ (706).

On the other hand, the authentication server 104 calculates e from the received information and delivers an ID (or I), X, y, and e to the HSM 104a so as to calculate a value Z (708). Then, the HSM 104a calculates the value Z as follows using the above-described values and a pre-stored private key $t_{ID}$ and returns the value Z to the authentication server 104 (710).

The authentication server 104 calculates a secret key K using the above-described value Z and restores an encrypted message received from the terminal 112 or 114 using the calculated secret key to obtain the user's password PW or pw from the restored message. Thereafter, the authentication server delivers the user's ID and password to the HSM 104a to make a validity check request (712), and the HSM 104a returns a verification value $v_{pw}$ when it is determined that the ID/password is valid after the validity of the ID and password received according to the above-described request is verified (714).

When the validity check of the HSM 104a on the password delivered from the terminal 112 or 114 succeeds, the authentication server 104 may authenticate that the terminal 112 or 114 is a valid user. When the authentication of the terminal 112 or 114 is completed in this manner, the authentication server 104 calculates a session key sk and $C_2$ using Z and delivers $C_2$ to the terminal 112 or 114 (716). Then, the terminal 112 or 114 authenticates that the authentication server 104 is a valid server by verifying the validity of transmitted $C_2$.

Next, the authentication server 104 generates a public key ID_Today of the corresponding cycle as follows by adding the terminal-side random character string $R_{C\_Today}$ and the server-side random character string $R_{S\_Today}$ received in the above-described step 702 to the ID of the terminal 112 or 114 and delivers the generated public key ID_Today to the private-key generator 106 (718).

$$ID\_Today = ID \| R_{C\_Today} \| R_{S\_Today}$$

As described above, the private-key generator 106 stores a master key for generating the private value in a separate HSM (not illustrated). The private-key generator 106 generates the private key $t_{ID\_today}$ of a user corresponding to a certain cycle using the above-described HSM and delivers the generated private key $t_{ID\_today}$ to the authentication server 104 (720). Then, the authentication server 104 securely delivers the private key $t_{ID\_today}$ received using the above-described session key sk and the designated cryptography algorithm (which is assumed to be an AES in the illustrated exemplary embodiment) (722). That is, the authentication server 104 encrypts the private key $t_{ID\_today}$ using the cryptography algorithm in which the session key is the encryption key, and delivers the encrypted private key $t_{ID\_today}$ to the terminal 112 or 114. The terminal 112 or 114 acquires the private key by decrypting the received message using the same session key as that of the authentication server 104.

Figure 8:
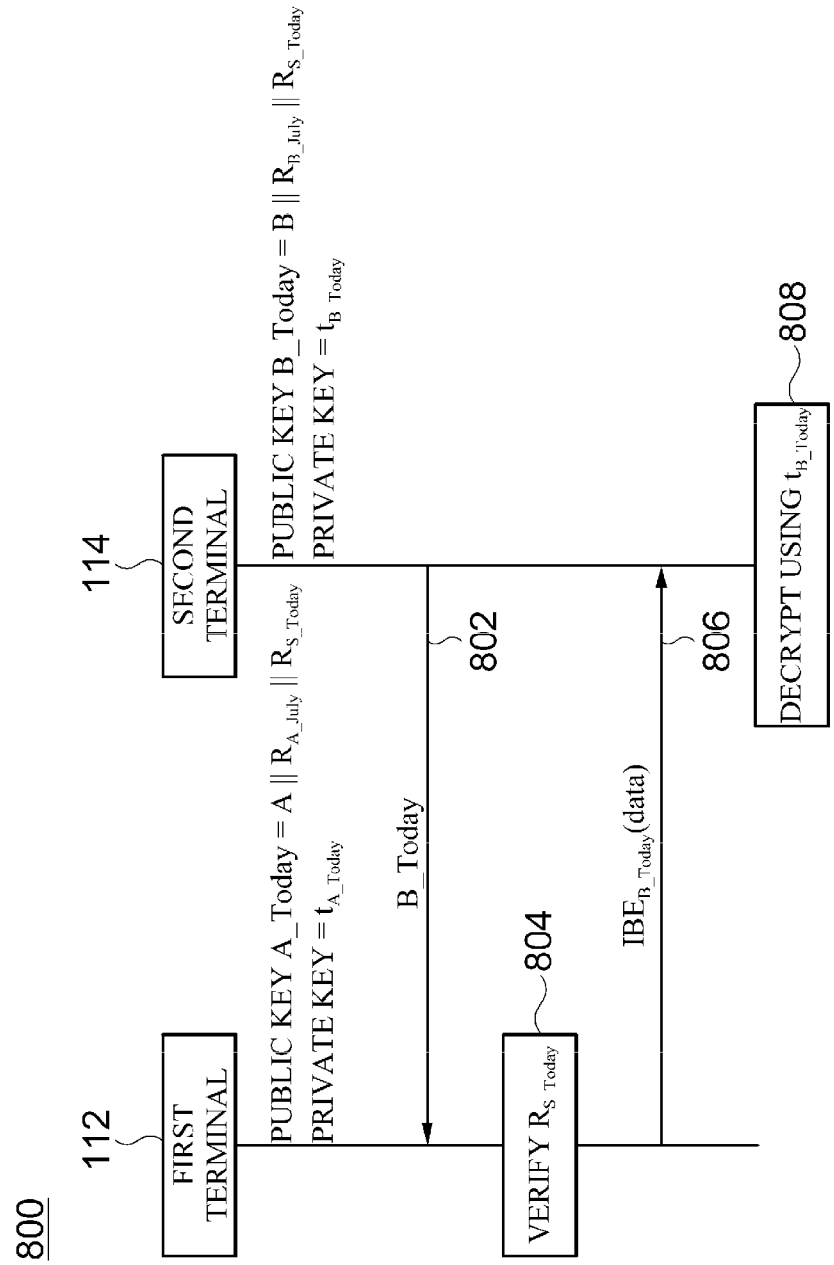
FIG. 8 is a diagram illustrating an encrypted message transmission and reception process between terminals receiving issued private keys according to the third exemplary embodiment of the present disclosure.

FIG. 8 is a diagram illustrating an encrypted message transmission and reception process between terminals receiving issued private keys according to the third exemplary embodiment of the present disclosure.

When receiving private keys issued from the authentication server 104 through the above-described process, the first terminal 112 and the second terminal 114 can perform encrypted communication using public keys of communication partners. For example, assuming that the ID of the first terminal 112 is "A," the ID of the second terminal 114 is "B," an update cycle of a client-side random character string is a "day," and an update cycle of a server-side random character string is a "month," the public keys and the private keys of the first terminal 112 and the second terminal 114 may be represented as follows.

In the first terminal 112, Public key $A\_Today = A \| R_{A\_July} \| R_{S\_Today}$ In the first terminal 112, Private key = $t_{A\_Today}$ In the second terminal 114, Public key $B\_Today = B \| R_{B\_July} \| R_{S\_Today}$ In the second terminal 114, Private key = $t_{B\_Today}$ Although separate server interaction is not necessary for every encrypted communication of a corresponding cycle before a message is transmitted in this exemplary embodiment, a prearranged handshaking process for obtaining a valid client-side random character string of a corresponding cycle of the receiver before encryption is performed may be necessary. In order to verify the validity of the client-side random character string received from the communication partner as described above, the server-side random character string to be updated for every cycle is used instead of a signature. The illustrated sequence diagram illustrates a process in which the first terminal 112 transmits a message to the second terminal 114.

First, the first terminal 112 receives a public key B_Today of a corresponding cycle from the second terminal 114 (802), and verifies the received server-side random character string included in the received public key (804). If the verification result indicates that the received server-side random character string is valid, the first terminal 112 encrypts a message (data) using the public key B_Today of a corresponding cycle and transmits the encrypted message (data) to the second terminal 114 (806). The second terminal 114 receiving the message restores the message by decrypting the received message using its own private key $t_{B\_Today}$ (808).

On the other hand, various methods may be applicable to receive the server-side random character string of a corresponding cycle from the authentication server 104.

First, when an own private key is updated as illustrated in FIG. 7, mutual authentication can be performed through key exchange based on an ID and a password. In addition, it is possible to receive a server-side random character string from the authentication server 104 through authentication between a server and a user regardless of private key issuance.

In addition, because the server-side random character string is not secret information, the authentication server 104 may broadcast the server-side random character string of a corresponding date at a given time (for example, on everyday midnight) through a public channel or publish the sever-side random character string on a public website. In this case, because although the random character string value itself is not secret information, an authentication task for checking that the random character string value has been delivered from an authenticated server is necessary, a separate electronic signature technique or a method such as publishing on an authorized website may be applicable to the authentication task.

Exemplary embodiments according to the present disclosure may include a computer-readable recording medium having a program for performing methods described in the present specification on a computer. The computer-readable recording medium may include a program command, a local data file, and a local data structure individually or in combination. The above-described medium may be a medium specially designed and configured for the present disclosure or already known to and used for those skilled in the art of the computer software field. An example of the computer-readable recording medium includes magnetic media such as a hard disk, a floppy disk, and a magnetic tape, optical media such as a compact disc-read only memory (CD-ROM) and a digital versatile disc (DVD), a magneto-optical medium such as a floppy disk, and a hardware device specially formed to store and perform a program command, such as a ROM, a random access memory (RAM), and a flash memory. An example of the program command includes a high-level language code that can be executed by a computer using an interpreter as well as a machine language code made by a compiler.

Although the present disclosure has been described through a certain embodiment, it shall be appreciated that various permutations and modifications of the described embodiment are possible by those skilled in the art to which the present disclosure pertains without departing from the scope of the present disclosure.

Therefore, the scope of the present disclosure shall not be defined by the described embodiment but shall be defined by the appended claims and their equivalents.

What is claimed is:

1. An identity (ID)-based key management system comprising:
an authentication server comprising a memory and at least one processor, the at least one processor being configured to authenticate a terminal through key exchange based on an ID and a password of a user of the terminal, generate a temporary ID by adding a padding character string to the ID, set up a secure channel with the terminal, and provide a private key based on the temporary ID to the terminal through the secure channel; and
a private-key generator configured to generate the private key corresponding to the temporary ID according to a request of the authentication server,
wherein the authentication server is further configured to generate the temporary ID by adding a terminal-side random character string corresponding to a first cycle and a server-side random character string corresponding to a second cycle to the ID, wherein an update cycle of the first cycle is set to be different from an update cycle of the second cycle.

2. The system of claim 1, wherein the authentication server generates an ID-based secret key using a key generation factor exchanged with the terminal and decrypts the password transmitted from the terminal using the secret key.

3. The system of claim 2, wherein the authentication server authenticates the ID and the password using a hardware security module (HSM).

4. The system of claim 1, wherein the private-key generator generates the private key using an HSM.

5. The system of claim 1, wherein the padding character string includes date information of the cycle.

6. The system of claim 1, wherein the padding character string includes a terminal-side random character string and a server-side ID-based signature (IBS) of the cycle.

7. The system of claim 6, wherein the authentication server receives the terminal-side random character string from the terminal,
generates the temporary ID by adding the received terminal-side random character string to the ID of the terminal,
generates the server-side IBS for the temporary ID using the private key of the authentication server, and
transmits the generated server-side IBS to the terminal.

8. The system of claim 7, wherein the authentication server generates the server-side IBS using an HSM.

9. The system of claim 1, wherein the authentication server exchanges the terminal-side random character string and the server-side random character string with the terminal.

10. The system of claim 1, wherein the authentication server generates an ID-based session key using a key generation factor exchanged with the terminal, encrypts the private key with the generated session key, and provides the encrypted private key to the terminal.

11. An ID-based key management method comprising:
authenticating, by an authentication server, a terminal through key exchange based on an ID and a password of a user of the terminal to set up a secure channel with the terminal;
generate a temporary ID by adding a padding character string to the ID;
generating, by the authentication server, a private key based on the temporary ID; and
providing, by the authentication server, the private key to the terminal through the secure channel,
wherein the authentication server generates the temporary ID by adding a terminal-side random character string corresponding to a first cycle and a server-side random character string corresponding to a second cycle to the ID, and wherein an update cycle of the first cycle is set to be different from an update cycle of the second cycle.

12. The method of claim 11, wherein the authenticating further includes:
exchanging a key generation factor with the terminal;
generating an ID-based secret key using the key generation factor; and
decrypting the password transmitted from the terminal using the secret key.

13. The method of claim 11, wherein the padding character string includes date information of the cycle.

14. The method of claim 11, wherein the padding character string includes a terminal-side random character string and a server-side IBS of the cycle.

15. The method of claim 14, wherein the authenticating further includes:
receiving the terminal-side random character string from the terminal;
generating the temporary ID by adding the received terminal-side random character string to the ID of the terminal;
generating the server-side IBS for the temporary ID using the private key of the authentication server; and
transmitting the generated server-side IBS to the terminal.

16. The method of claim 11, wherein the authenticating further includes:
exchanging the terminal-side random character string and the server-side random character string with the terminal.

17. The method of claim 11, wherein the providing further includes:
encrypting the private key with an ID-based session key generated using a key generation factor exchanged with the terminal; and
providing the encrypted private key to the terminal.

* * * * *